United States Patent
White et al.

(10) Patent No.: US 11,703,185 B2
(45) Date of Patent: Jul. 18, 2023

(54) APPARATUS, SYSTEMS, AND METHODS FOR STORING AND TRANSPORTING COMPRESSED FLUIDS

(71) Applicant: ezNG SOLUTIONS LLC, Houston, TX (US)

(72) Inventors: Charles N. White, Spicewood, TX (US); Scott C. McClure, Houston, TX (US)

(73) Assignee: ezNG Solutions, LLC, Houston, TX (US)

( * ) Notice: Subject to any disclaimer, the term of this patent is extended or adjusted under 35 U.S.C. 154(b) by 98 days.

(21) Appl. No.: 17/209,116

(22) Filed: Mar. 22, 2021

(65) Prior Publication Data
US 2022/0299164 A1 Sep. 22, 2022

(51) Int. Cl.
*F17C 3/02* (2006.01)

(52) U.S. Cl.
CPC ...... *F17C 3/022* (2013.01); *F17C 2203/0629* (2013.01); *F17C 2221/012* (2013.01); *F17C 2221/013* (2013.01); *F17C 2223/0161* (2013.01)

(58) Field of Classification Search
CPC ...... F17C 2201/0166; F17C 2205/0142; F17C 1/02; F17C 2201/0152; F17C 2201/0133;
(Continued)

(56) References Cited

U.S. PATENT DOCUMENTS 5,577,630 A    11/1996   Blair et al.
5,651,474 A *   7/1997   Callaghan ............. B29C 70/088
                                                          220/565
(Continued)

FOREIGN PATENT DOCUMENTS

EP        2160539 A2    3/2010
JP      2007205470 A    8/2007
(Continued)

OTHER PUBLICATIONS

International Search Report for PCT/US/2022/017511, pp. 1-3, KIPO, published Jun. 7, 2022.
(Continued)

*Primary Examiner* — Shawn M Braden
(74) *Attorney, Agent, or Firm* — Jeffrey L. Wendt; The Wendt Firm, P.C.

(57) ABSTRACT

Composite tank apparatus and methods of making and using same. An array of flat-sided co-dependent cells with relatively thin skins made of metallic or non-metallic materials. Each cell has at least two flat wall panel portions connected by radiused sections arranged such that all of the flat wall panel portions are either in flush contact with each other or in flush contact with flat supporting panels of an enclosing structure or thermal insulating material lining an interior thereof. The cells are sealed with each other around a perimeter of at least one pair of matching lightening through-wall holes provided in adjacent pairs of the wall panel portions of the cells to resist relative movement and prevent leakage of fluid therefrom. The composite tank apparatus may include an enclosing structure, and optionally, one or more layers of thermally insulating material lining the interior surface or the exterior surface of the enclosing structure.

23 Claims, 8 Drawing Sheets

(58) Field of Classification Search
CPC ...... F17C 2201/0147; F17C 2201/0171; F17C 3/022; F17C 2203/0629; F17C 2221/012; F17C 2221/013; F17C 2223/0161
See application file for complete search history.

(56) References Cited

U.S. PATENT DOCUMENTS

| | | | |
|---|---|---|---|
| 5,676,180 A | 10/1997 | Teel | |
| 5,918,911 A | 7/1999 | Sims | |
| 5,938,246 A | 8/1999 | Wallace | |
| 6,074,595 A | 6/2000 | Eisberg | |
| 6,834,689 B1 | 12/2004 | Peters | |
| 7,658,300 B2 | 2/2010 | Eckert | |
| 8,182,820 B2 | 10/2012 | White | |
| 8,607,830 B2 | 12/2013 | White | |
| 9,033,178 B2 | 5/2015 | White | |
| 9,352,369 B2 | 5/2016 | Niccolls | |
| 9,664,338 B2 | 5/2017 | Hata et al. | |
| 10,006,719 B2 | 6/2018 | Talgen | |
| 10,519,524 B2 | 12/2019 | Kimura | |
| 11,047,529 B2 | 6/2021 | Kuczek et al. | |
| 2008/0209918 A1* | 9/2008 | White | F17C 13/026 62/50.1 |
| 2014/0103046 A1 | 4/2014 | Hata et al. | |
| 2014/0144887 A1* | 5/2014 | Claudel | F17C 1/06 219/72 |
| 2017/0254481 A1* | 9/2017 | Cadogan | F17C 13/001 |
| 2018/0281992 A1* | 10/2018 | Manning | B64G 1/402 |
| 2019/0128476 A1 | 5/2019 | Kuczek et al. | |
| 2020/0158285 A1* | 5/2020 | Zhevago | F17C 1/16 |
| 2020/0180428 A1* | 6/2020 | Sawai | B60K 15/067 |
| 2020/0231034 A1* | 7/2020 | Buchholz | B60K 15/03006 |

FOREIGN PATENT DOCUMENTS

| | | |
|---|---|---|
| JP | 2010525242 A | 7/2010 |
| JP | 5357060 B2 | 12/2013 |
| JP | 5897502 B | 3/2016 |
| WO | WO08109006 A2 | 9/2008 |
| WO | WO08109011 A2 | 9/2008 |
| WO | WO2022203793 A | 9/2022 |

OTHER PUBLICATIONS

Written Opinion of the International Search Authority for PCT/US/2022/017511, pp. 1-6, KIPO, published Jun. 7, 2022.

* cited by examiner

APPARATUS, SYSTEMS, AND METHODS FOR STORING AND TRANSPORTING COMPRESSED FLUIDS

BACKGROUND INFORMATION

Technical Field

The present disclosure relates to an apparatus for storing and transporting moderately compressed fluids (esp., cold compressed fluids), and methods for fabricating or constructing the apparatus for storing and transporting same. More particularly, the present disclosure relates to containment systems comprised of an array of co-dependent storage cells within an insulated high integrity structural enclosure to create a composite tank for storage and, when desired, transport of fluids (a "composite tank").

Background Art

As noted in U.S. Pat. No. 9,033,178 B2, assigned to ezNG Solutions LLC, Houston, Tex., in the petroleum and chemical industries, it is customary to store liquids and the like within large tank structures which are typically exposed to the elements, both heat and cold. These storage tanks usually comprise steel or other metallic tank structures that by reason of being exposed to ambient or near ambient conditions and thermal loads must be provided with a suitable insulating material so that the products in storage within the tanks may be kept at the desired temperatures.

Various arrangements or systems have been provided in the past for storage of cold or even cryogenic fluids (usually, liquids or dense phase fluids) at modest or nearly ambient storage pressures. Even at these relatively low pressures, the cold fluids are typically stored in containers of circular cross-section to obtain a hoop stress condition that limits the wall thickness of the container. However, when the diameter of the container is large enough or the internal pressure high enough the required wall thickness can still be so large as to cause penalizing increases in cost of materials, welding, and fabrication. The concepts described in U.S. Pat. No. 9,033,178 B2 for designing and using arrays of independent flat-sided storage cells that support each other within a structurally sound containment space provide the means for limiting the thickness of the walls of the containers and the resulting total cost of the storage apparatus. Using the concepts of U.S. Pat. No. 9,033,178 B2, large storage tanks containing cold fluids under modest pressure can be designed and built at low cost compared to large diameter flat-bottom, bullet-type, or multi-lobe tanks of the same total internal storage capacity. However, these cellular arrays that comprise each storage tank still require a large amount of expensive wall material because the cellular array of cells with flat walls will typically have more surface area per unit of internal volume. Further, since the calculation of minimum wall thickness for the skin of the cells tends to be dominated by a specified internal design pressure, the minimum wall thickness needed to safely contain the specified pressure (under relevant pressure vessel design codes) can be quite small if the radii of the curved edges of the cells are small. In fact, the wall thickness for the skin of the cells may need to be specified to be much thicker than the minimum required to safely contain the specified pressure due to fabrication and handling considerations if the curved edge radii are small compared to the overall dimensions of the cells. In such cases, the excess wall thickness margin imposed due to fabrication and handling concerns diminishes the potential material cost savings provided by '178.

Each cell in the array comprising the primary containment of the composite storage tank requires access penetrations for fluid injection and withdrawal as well as for human or monitoring device access. Since a single tank described in U.S. Pat. No. 9,033,178 B2 may be comprised of many cells, the cost of these accessways into and the conduits for fluid transfer interconnecting the cells to allow fluid transfer into or from the tank and to ensure that all cells comprising a tank are essentially pressure-balanced throughout become an important feature of total system pricing. In this disclosure, the fluid conduits may typically be referred to as pipes or as risers when oriented vertically, while a system of conduits may be referred to as piping or a piping system. Further, the external piping (i.e., conduits for interconnecting an the cells in the composite tank) includes many pipe-to-pipe connections from which the potential for leaks of hazardous fluid cargos represents real "risk costs" for owners/operators of storage systems incorporating the cellular array concepts of U.S. Pat. No. 9,033,178 B2.

Therefore, it would be beneficial and an advance in the storage art for compressed fluids to provide apparatus, systems, and methods of fabricating and using same that limit the total amount of cell wall material as well as the quantity of accessways with penetrations and external piping connections required to complete a composite tank of any specified internal volume.

SUMMARY

In accordance with the present disclosure, apparatus, systems, and methods of fabricating and using same are presented that overcome some or all of the deficiencies of previous designs. Making through-wall holes in some or all of adjacent flat wall panel portions of cells comprising the primary containment of the composite tank fluid containment system such as described in the '178 patent that are sealed along their perimeters to matching through-wall holes in adjacent cell walls allows reduction in the total amount of cell wall material and the quantity of external accessway penetrations and external piping system interconnections. Conventional engineering analysis will indicate how much wall material can be removed in the making of the through-wall holes as well as how much stiffening may be required around the edges of these holes to maintain structural stability during fabrication, handling, and operation.

A first aspect of the disclosure is a composite tank apparatus for fluid containment at pressures at or near ambient (i.e., less than about 1 barg or 14.5 psig) to moderate (typically, less than about 50 barg or 725 psig though it is theoretically possible to design for much higher pressures) comprising (or consisting essentially of, or consisting of):

a) an array of at least two flat-sided co-dependent cells with relatively thin skins (i.e., "cell walls") made of metallic (e.g., steel or aluminum alloys typically less than about 25.4 mm or 1 inch and practically no more than 76.2 mm or 3 inches thick) or non-metallic materials (e.g., fiber-impregnated artificial rubber sheet, fiber-resin matrix, or even ferro-cement materials) wherein each of the at least two flat-sided co-dependent cells has at least two flat wall panel portions connected by radiused sections arranged such that all of the flat wall panel portions of the at least two flat-sided co-dependent cells are either in flush contact with each other or in flush contact with flat supporting panels of an enclosing structure (or thermal insulating material lining an interior of the enclosing structure) enclosing the array of at least two flat-sided co-dependent cells, each of the at least two flat-sided co-dependent cells having a top and a bottom cap (sometimes referred to herein as top and bottom heads) connected respectively to top and bottom ends of the cell walls and radiused sections;

b) the at least two flat-sided co-dependent cells sealed with each other around a perimeter of at least one matching pair of lightening through-wall holes provided in adjacent pairs of the flush-contacting flat wall panel portions of the at least two flat-sided co-dependent cells in the composite tank, the perimeter of all the pairs of lightening through-wall holes sufficiently sealed to structurally resist relative movement and prevent leakage of fluid from containment (by, as for example, a continuous weldment joining the adjacent pairs of the flush-contacting flat wall panel portions);

c) the enclosing structure having an interior surface and an exterior surface, and a cover, the enclosing structure and cover configured to provide environmental isolation with sufficient structural strength and with sufficient rigidity to support exterior flat side panel portions of the at least two flat-sided co-dependent cells at exterior portions of the array of at least two flat-sided co-dependent cells, as disclosed further herein; and d) optionally, one or more layers of thermally insulating material lining the interior surface or the exterior surface of the enclosing structure. If the contained fluid is to be stored in the composite tank at or near normal ambient temperatures, then insulation is unlikely to be required.

In certain embodiments, the composite tank is configured for storage of fluids that must be contained at temperatures at least 10° C. different from normal ambient conditions. In such embodiments, thermal insulating layer or layers may be provided as part of the composite tank. In embodiments where the stored fluid is injected and intended to be stored at temperatures below about minus 40° C. and the enclosing structure (e.g., bulkheads and decks or inner bottom of a ship) are made of non-cryogenic (mild or low alloy) steel, then the one or more layers of thermally insulating material should be designed and installed to establish a barrier to protect the steel enclosure from risk of brittle failure.

In certain embodiments, the composite tank apparatus comprises one or more fluid accessways, openings, or conduits for injection and withdrawal of fluids. In certain embodiments, the fluid accessways may comprise one or more conduits that penetrate into the top or bottom caps of one or more of the at least two flat-sided co-dependent cells comprising the composite tank apparatus to join with one or more manifolds that run horizontally within co-dependent cells and through adjacent interior walls of the array of the at least two flat-sided co-dependent cells allowing simultaneous injection and ejection (often called "withdrawal") of fluids.

Certain composite tank embodiments may comprise one or more top-mounted accessway fittings (as allowed by the ASME Pressure Vessel codes) to allow humans or non-human devices (e.g., autonomous or semi-autonomous drones) to gain access to an interior of one or more of the at least two flat-sided co-dependent cells for inspection, monitoring, and/or repair of the cells or interior conduits.

Certain composite tank embodiments may comprise one or more top-mounted accessway fittings comprising pressure-competent fluid conduits (i.e., pipe fittings as allowed by the ASME Pressure Vessel codes) to top caps of one or more of the co-dependent cells for the purpose of injecting fluids into or withdrawing fluids from the composite tank.

Certain composite tank embodiments may include bottom-mounted accessway fittings comprising pressure-competent fluid conduits (i.e., pipe fittings as allowed by the ASME Pressure Vessel codes) to bottom caps of one or more of the co-dependent cells for the purpose of injecting fluids into or withdrawing fluids from the composite tank.

Certain composite tank embodiments may include penetrations with such pressure-competent fittings on any of the radiused sections of any cell or exterior flat panels of the cells at ends of the array of co-dependent cells, although top accessways and top and bottom penetrations will provide more workable locations in most embodiments.

Certain system embodiments of the present disclosure may also include other features as described herein such as simplified arrangements of internally run interconnecting manifolds enabled by the inclusion of lightening through-wall holes across adjacent walls of the co-dependent cells comprising the composite tank apparatus.

A second aspect of the present disclosure are methods of making a substantially metallic composite tank system of the first aspect, comprising (or consisting essentially of, or consisting of):

a) providing a plurality of thin metallic flat wall panel portions, a plurality of metallic radiused sections (which will in certain embodiments incorporate narrow tangent edge portions to facilitate transition to and alignment with the edges of the flat panel portions), and a plurality of metallic top and bottom caps to produce at least two flat-sided co-dependent cells with relatively thin skins having a thickness ranging from about 5 to about 25 mm, or from about 25 to about 75 mm;

b) optionally providing one or more accessways where and as needed in the plurality of thin metallic flat wall panel portions;

c) optionally providing one or more penetrations where and as needed in the plurality of metallic top and bottom caps;

d) fastening (for example, by welding) the vertically running edges of the panel portions to the at least two radiused sections to form a plurality of cell bodies, and fastening (for example by welding) the plurality of metallic top and bottom caps to the plurality of cell bodies to form the at least two flat-sided co-dependent cells with relatively thin skins (as compared to the skin thickness of large diameter "bullet" tanks designed to carry the same internal storage volume and pressure);

e) arranging the at least two flat-sided co-dependent cells with relatively thin skins such that all of the flat wall panel portions of the at least two flat-sided co-dependent cells are either in flush contact with each other or in flush contact with flat supporting panels of an enclosing structure (or thermal insulating material lining an interior of the enclosing structure) to form an enclosed array of at least two flat-sided co-dependent cells;

f) sealing (by, as for example, a continuous weldment) the at least two flat-sided co-dependent cells with each other around a perimeter of at least one matching pair of lightening through-wall holes provided in adjacent pairs of the flush-contacting flat wall panel portions of the at least two flat-sided co-dependent cells in the composite tank, the perimeter of all the matching pairs of tightening through-wall holes sufficiently sealed to structurally resist relative movement and prevent leakage of fluid from containment; and g) the enclosing structure having an interior surface and an exterior surface, and a cover, the enclosing structure and cover configured to provide environmental isolation with sufficient structural strength and with sufficient rigidity to support exterior flat side panel portions of the at least two flat-sided co-dependent cells at exterior portions of the array of at least two flat-sided co-dependent cells such that, when internal pressure is established within the array of at least two flat-sided co-dependent cells at a targeted level for operations or survival, the at least two flat-sided co-dependent cells of the array are prevented from expanding and displacing (to a degree that would generate unacceptable stresses or collapse according to current ASME Boiler and Pressure Vessel codes, for example, as discussed herein).

A third aspect of the present disclosure are methods of flowing (for example, injecting) fluid into and extracting (withdrawal) of the same or different fluid from tops and bottoms of the array of cells of the first aspect comprising the primary containment of a composite tank apparatus for fluid containment, the method comprising (or consisting essentially of, or consisting of):

(a) providing upper and lower horizontal fluid conducting manifolds that extend internally through paired through-wall holes in adjacent flat wall panel portions of all adjacent cells of the array of at least two flat-sided cells comprising the composite tank apparatus of the first aspect;

(b) providing a first plurality of risers (i.e., vertical fluid conduit segments) fluidly connected to and running from the upper horizontal fluid conducting manifold to near a top of each cell's top cap in the array of cells comprising said tank apparatus providing a flow path from the top of each cell into the upper horizontal fluid conducting manifold;

(c) providing a second plurality of risers fluidly connected to and running from the lower horizontal fluid conducting manifold to near a bottom of each cell bottom cap in the array of cells comprising the composite tank apparatus of the first aspect, providing a flow path from the bottom of each cell into the lower horizontal fluid conducting manifold;

(d) providing at least one third riser fluidly connected to and running from the upper horizontal fluid conducting manifold to and through an accessway fitting on the top cap or bottom cap of at least one of the cells in the array of cells comprising the composite tank apparatus; and (e) providing at least one fourth riser fluidly connected to and running from the lower horizontal fluidly conducting manifold to and through an accessway fitting on the top cap or bottom cap of at least one of the cells in the array of cells comprising the composite tank apparatus; and (f) flowing a low density fluid of a first specified pressure and a first temperature into or out of an upper part of the composite tank apparatus of the first aspect through the at least one third riser while flowing a higher density fluid of the same or different chemical composition and of a second specified pressure and a second temperature simultaneously into or out of the bottom of the cells in the array of cells comprising the composite tank apparatus of the first aspect through the at least one fourth riser in a manner that allows a targeted pressure and temperature regime to be maintained within the composite tank apparatus.

These and other features of the composite fluid containment tank apparatus, systems, and methods in accordance with the present disclosure will become more apparent upon review of the brief description of the drawings, the detailed description, and the claims that follow. It should be understood that wherever the term "comprising" is used herein, whether describing an embodiment or a component or step of an embodiment, other alternative embodiments, components, and steps where the term "comprising" is substituted with "consisting essentially of" are explicitly disclosed herein. It should be further understood that wherever the term "comprising" is used herein, other alternative embodiments, components, and steps where the term "comprising" is substituted with "consisting of" are explicitly disclosed herein. Moreover, the use of negative limitations is specifically contemplated; for example, a composite tank of the present disclosure may comprise a number of physical components and features but may be devoid of certain optional hardware and/or other features. For example, certain systems of this disclosure may be devoid of weldments welded to the cells comprising a tank. Further, a component may be devoid of passages, cavities, slots, and the like, in other words, may be a solid piece. Certain system embodiments may be devoid of insulation material.

BRIEF DESCRIPTION OF THE DRAWINGS

The manner in which the objectives of this disclosure and other desirable characteristics can be obtained is explained in the following description and attached drawings in which:

FIGS. 1A, 1B, and 1C schematically illustrate a three-cell composite tank apparatus as a basic form of the pressure-competent fluid containment tank apparatus disclosed in U.S. Pat. No. 9,033,178 B2, wherein FIG. 1A is a schematic plan view, FIG. 1B is a schematic midway cross-sectional view, and FIG. 1C is a side elevation view of one of the two-sided flask cells within the tank's insulated structural enclosure;

FIGS. 2A, 2B, and 2C schematically illustrate one embodiment of a composite tank apparatus with lightening holes provided in accordance with the present disclosure, wherein FIG. 2A is a schematic plan view, FIG. 2B is a schematic midway cross-sectional view, and FIG. 2C is a schematic side elevation view;

FIGS. 5A, 5B, and 5C schematically illustrate a multi-cell composite tank apparatus (comprised of ten two-sided cells) with through-wall lightening holes provided in adjacent flat wall panel portions of the co-dependent cells confined within an insulated hold of a marine vessel (ship or barge) according to one embodiment of the present disclosure, wherein FIG. 5A is a schematic plan view, FIG. 5B is a schematic side elevation view, and FIG. 5C is a schematic side elevation view (for clarity, none of the internal fluid conduits (piping manifolds and risers) are depicted in FIGS. 5A-C);

FIGS. 6A, 6B, and 6C schematically illustrate two multi-cell composite tank apparatus with through-wall lightening holes provided in accordance with the present disclosure, wherein FIG. 6A is a schematic plan view, FIG. 6B is a schematic side elevation view, and FIG. 6C is a schematic cross-sectional elevation view (for clarity, none of the internal fluid conduits (piping manifolds and risers) are depicted in FIGS. 6A-C);

It is to be noted, however, that the appended drawings of FIGS. 1A-C, 2A-C, 3A-B, 4, 5A-C, and 6A-C may not be to scale and illustrate only typical apparatus and system embodiments of this disclosure. Furthermore, FIGS. 2A-6C illustrate only one of many possible embodiments of this disclosure that provide direct interconnectivity between the cells in a tank while reducing the total amount of material required to manufacture the skins of the cells in accordance with the present disclosure. Therefore, the drawing figures are not to be considered limiting in scope, for the disclosure may admit to other equally effective embodiments.

DETAILED DESCRIPTION

Figure 1A:
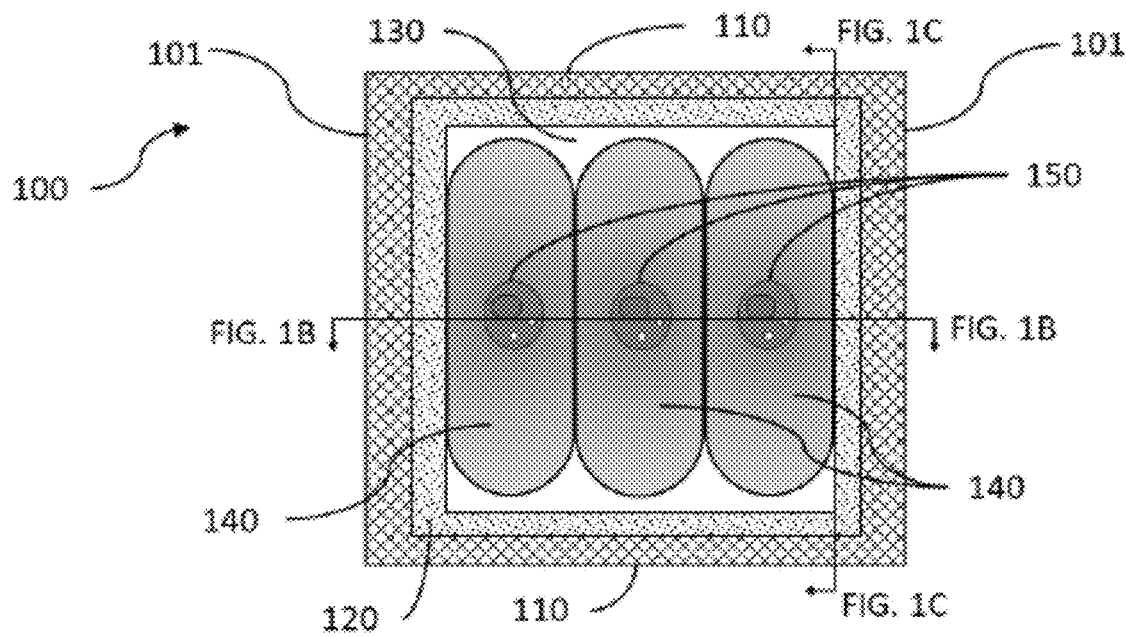

In the following description, details are set forth to provide an understanding of the disclosed fluid containment apparatus, systems, and methods. However, it will be understood by those skilled in the art that the apparatus, systems, and methods of the present disclosure may be practiced without these details and that numerous variations or modifications from the described embodiments may be possible. All U.S. patent applications and U.S. Patents referenced herein are hereby explicitly incorporated herein by reference, irrespective of the page, paragraph, or section in which they are referenced.

As noted in the Background, using the concepts of U.S. Pat. No. 9,033,178 B2, large storage tanks containing cold fluids under modest pressure can be designed and built at low cost compared to large diameter flat-bottom, bullet-type, or multi-lobe tanks of the same total internal storage capacity. However, these cellular arrays that comprise each storage tank still require a large amount of expensive wall material because the cellular array of cells with flat walls will typically have more surface area per unit of internal volume. Further, since the calculation of minimum wall thickness for the skin of the cells tends to be dominated by a specified internal design pressure, the minimum wall thickness needed to safely contain the specified pressure (under relevant pressure vessel design codes) can be quite small if the radii of the curved edges of the cells are small. In fact, the wall thickness for the skin of the cells may need to be specified to be much thicker than the minimum required to safely contain the specified pressure due to fabrication and handling considerations if the curved edge radii are small compared to the overall dimensions of the cells. In such cases, the excess wall thickness margin imposed due to fabrication and handling concerns diminishes the potential material cost savings provided by '178. Each cell in the array comprising the primary containment of the composite storage tank requires access penetrations for fluid injection and withdrawal as well as for human or monitoring device access. Since a single tank described in U.S. Pat. No. 9,033,178 B2 may be comprised of many cells, the cost of these accessways into the cells and the externally running conduits for fluid transfer interconnecting the cells to allow fluid transfer into or from the tank and to ensure that all cells comprising a tank are essentially pressure-balanced throughout become an important feature of total system pricing. In this disclosure, the fluid conduits may typically be referred to as pipes or as risers when oriented vertically, while a system of conduits may be referred to as piping or a piping system. Further, the external piping (i.e., conduits for interconnecting all the cells in the composite tank) includes many pipe-to-pipe connections from which the potential for leaks of hazardous fluid cargos represents real "risk costs" for owners/operators of storage systems incorporating the cellular array concepts of U.S. Pat. No. 9,033, 178 B2.

The present disclosure provides apparatus, systems, and methods of fabricating and using same that limit the total amount of cell wall material as well as the quantity of accessways with penetrations and external piping connections required to complete a composite tank of any specified internal volume.

As noted in the Summary, a first aspect of the disclosure are composite tank apparatus for fluid containment at pressures at or near ambient (i.e., less than 1 barg) to moderate (typically, less than about 50 barg) pressures. A second aspect are methods of making such composite tank apparatus, and a third aspect are methods of using such composite tank apparatus.

In certain embodiments, the composite tank is intended for storage of fluids that must be contained at temperatures at least 10° C. different from ambient conditions. In such cases, insulating layer or layers should be provided as part of the composite tank. If the stored fluid is injected and intended to be stored at temperatures below about minus 40° C. and the enclosing structure (e.g, bulkheads and decks or inner bottom of a ship) are made of non-cryogenic (mild or low alloy) steel, then the insulating materials should be designed and installed to establish a barrier to protect an enclosure made from mild or low alloy steel from risk of brittle failure.

The primary features of the fluid containment tank apparatus, combinations, and methods of the present disclosure will now be described with reference to the drawing figures, after which some of the construction and operational details, some of which are optional, will be further explained. The same reference numerals are used throughout to denote the same items in the figures.

Figure 1B:
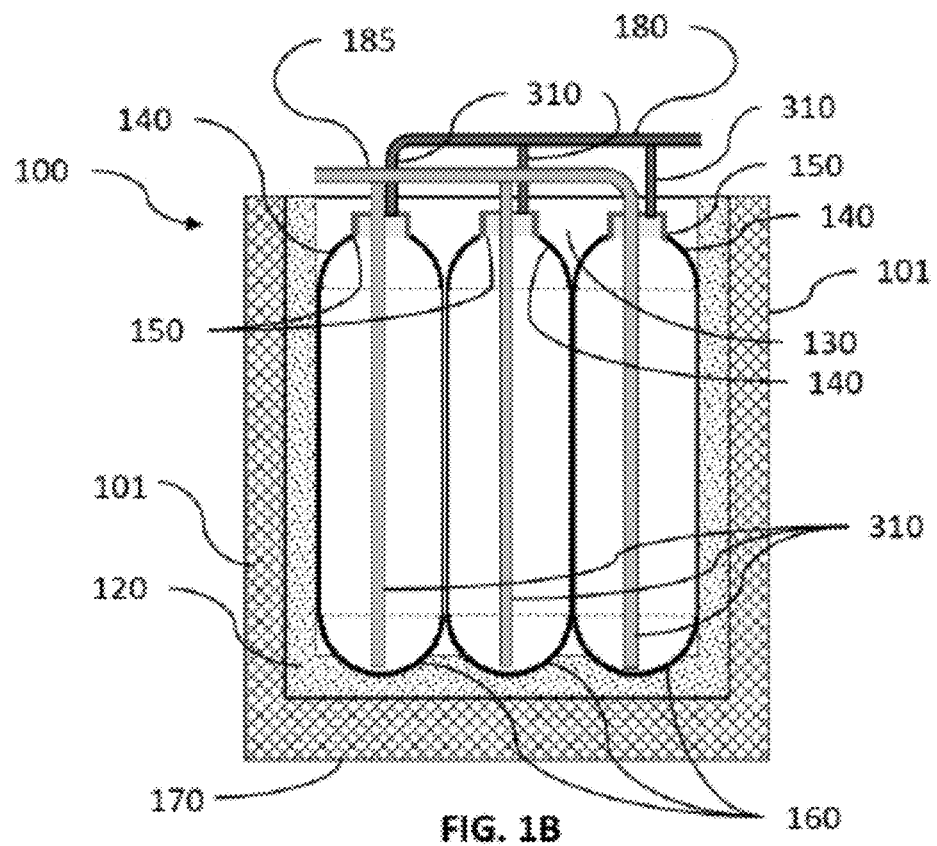
Figure 1C:
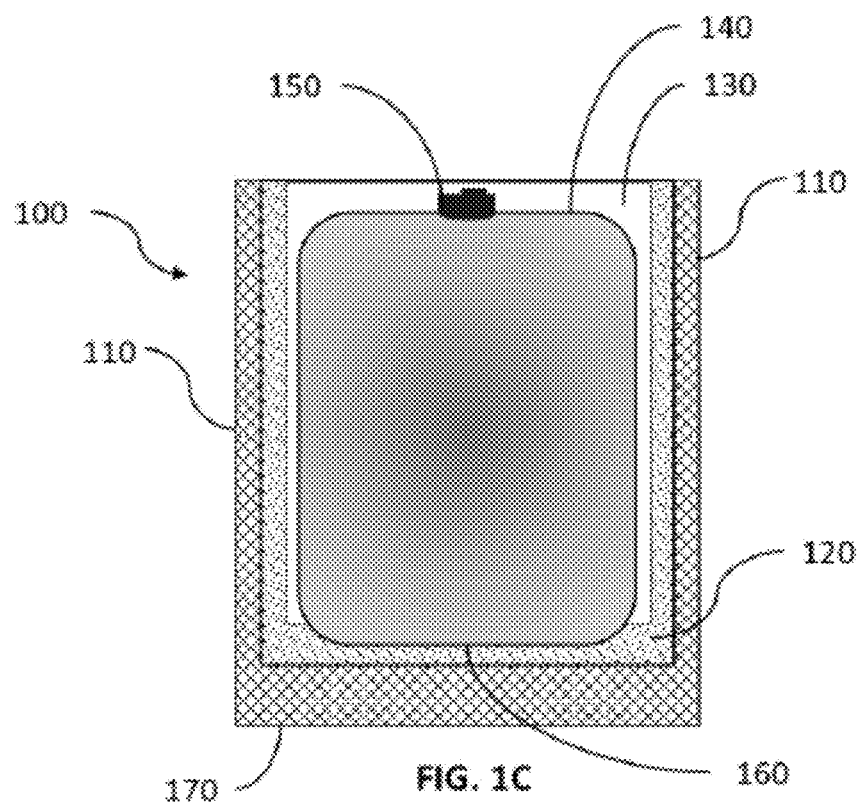
Figure 2A:
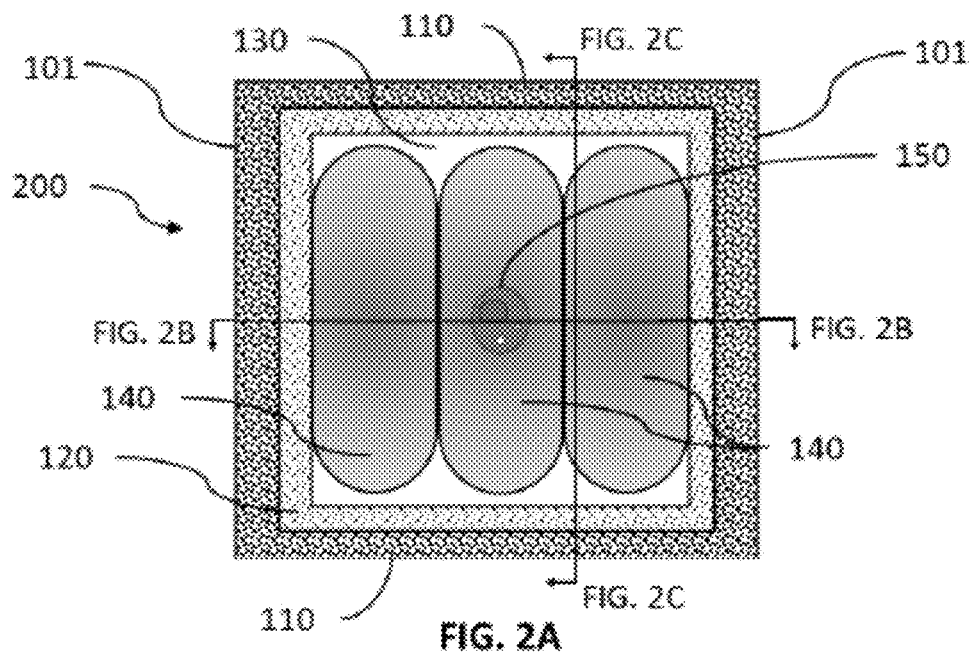
Figure 2B:
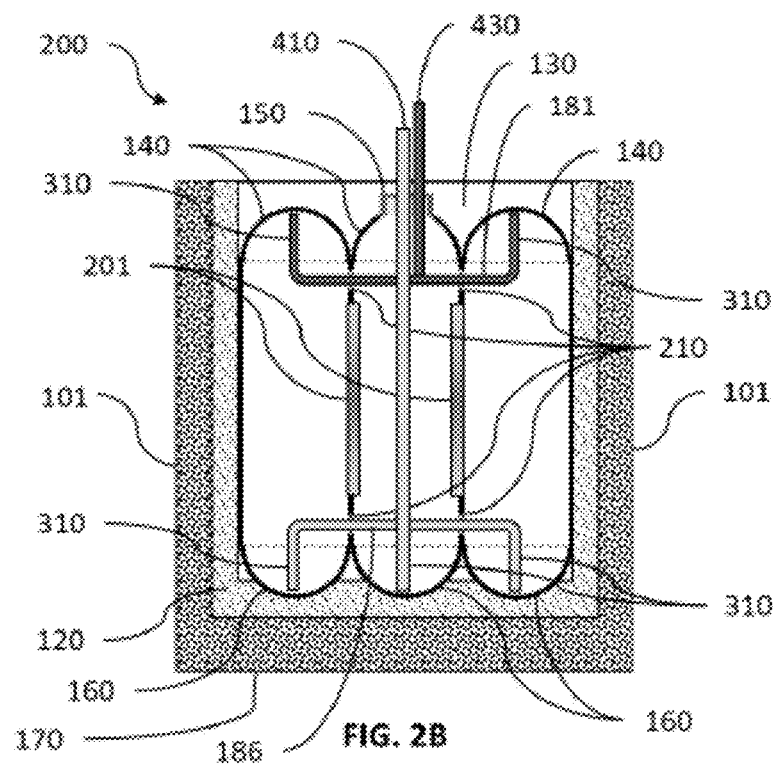
Figure 2C:
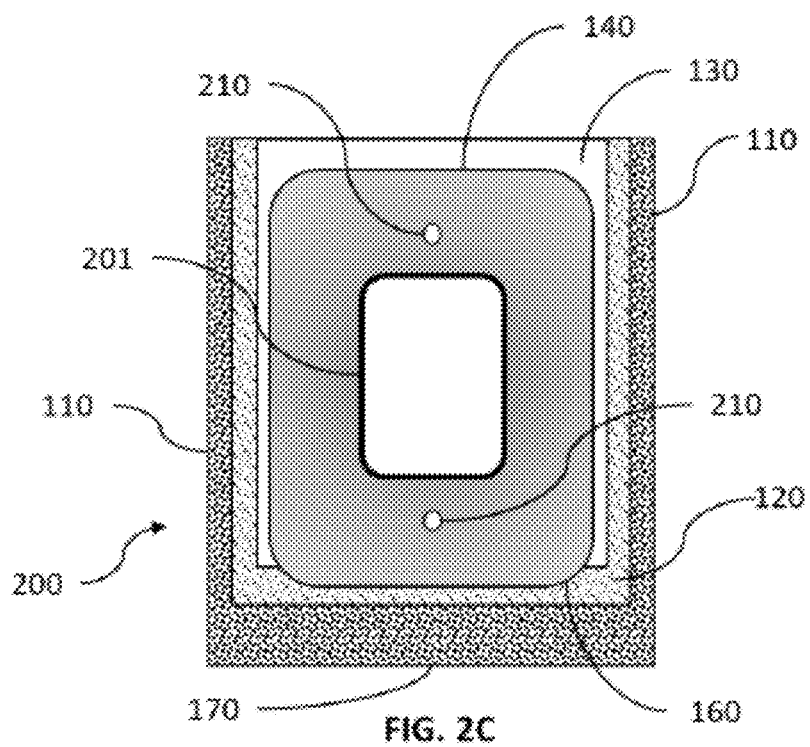

With reference to the drawings, FIGS. 1A-C schematically illustrate an embodiment of a composite tank apparatus for fluid containment as practiced according to U.S. Pat. No. 9,033,178 B2. FIGS. 2A-C schematically illustrate an embodiment of a composite tank apparatus for fluid containment that is distinct from and highly advantageous compared to a tank practiced according to U.S. Pat. No. 9,033,178 B2 in that the interiors of the cells of the tank are in direct fluid communication by providing carefully aligned through-wall holes in flush contacting, flat wall panel portions of adjacent flat-sided cells. The through-wall holes allow the provision of internally run interconnecting fluid conduits which can greatly reduce risks from fluid leaks at external connections between conduits.

FIGS. 1A, 1B, and 1C illustrate schematically three views of a single composite tank apparatus 100 for fluid containment as practiced according to U.S. Pat. No. 9,033,178 B2. FIG. 1A illustrates schematically a top-side plan view of a three-cell composite tank apparatus 100 for fluid containment as practiced according to U.S. Pat. No. 9,033,178 B2. The end walls 101 of the tank's enclosing structure are reinforced to structurally accommodate the pressure acting on the insulating layer 120 between the end walls 101 and flat side wall panel of the cells at each end of the array of three flat-sided cells that is imposed by pressure of the fluids stored within the tank apparatus. The side walls of the tank's structural enclosure 110 are structurally integrated with the end walls 101 and structurally reinforced (for example, post-tensioned if the walls are made of concrete) such that they can safely accommodate the pressure-induced forces acting on the end walls 101.

The end walls 101 and side walls 110 of the enclosing structure are either structurally integrated with the bottom 170 illustrated schematically in FIG. 1B and FIG. 1C in a way that rigidly resists the forces acting on the walls of the enclosure or are allowed to slide on a seal between them and the bottom 170 that maintains a desired environmental isolation and meets relevant codes.

The end walls 101 and side walls 110 of the enclosing structure are also either structurally integrated with a cover (not shown) in a way that at least partially resists the forces acting on the walls of the enclosure or are allowed to slide on a seal between them and the cover that maintains desired environmental isolation and meets relevant codes.

The walls and bottom of the tank's enclosure may, for example, be reinforced and post-tensioned concrete panels or stiffened metal (e.g., steel) or fiber-reinforced matrix panels, bulkheads, decks, or inner bottoms of a barge or ship. While the cover of these composite tanks may, for example, be similar panels or decks, a simple peaked metal or non-metal roof, or a membrane supported by frames or air pressure differential.

In this embodiment, a layer of insulation 120 lines the interior of the tank's enclosing structure. There is an enclosed atmosphere 130 within the space defined by the insulation lining the tank's enclosing structure and the tank cover. The composition, pressure, and temperature of this atmosphere is likely to be regulated and carefully monitored.

Each of the top caps 140 (also referred to herein as "heads") of the three cells illustrated schematically in FIGS. 1A, 1B, and 1C feature an accessway fitting 150 with fluid conduit and manway access penetrations.

FIG. 1B is a schematic cross-sectional view clearly illustrating the practice of U.S. Pat. No. 9,033,178 B2 wherein the flat side wall panels of each cell of the composite tank apparatus 100 are flush against the flat side wall panels of the adjacent storage cells or as in this embodiment a supporting layer of insulation 120. The risers (vertical fluid conduits) 310 connected to valve-controlled upper fluid conducting manifold 180 provide flow pathways from the tops 140 of the cells while the risers 310 connected to valve-controlled lower fluid conducting manifold 185 provide flow pathways from the bottoms 160 of the cells to enable simultaneous fluid injection to and extraction from the cells in a way that is intended to maintain pressure balancing across all cells. The external piping and manifolds provide the only interconnections between the otherwise independent cells. The semi-circular bottoms of the cells 160 (also called "heads") are sitting in and supported by depressions in the insulation 120 lining the bottom of the tank's bottom panel 170 of its structural enclosure. Valves for isolation and control of fluids being stored in this composite tank 100 are by common practice for those skilled in the art located outside of the composite tank enclosure and, thus, are not shown to simplify presentation of the concepts detailed herein.

FIG. 1C is a schematic broadside elevation view of one of the two-sided flask cells within the composite tank's insulated structural enclosure. The figure also illustrates how the cell bottom cap 160 sits in and can be supported by the insulation 120. However, FIG. 1C most prominently displays a cell's large flat side panel that is a key feature of the tanks of U.S. Pat. No. 9,033,178 B2. Further, FIG. 1C illustrates the point that the semi-circular edges of the cells require no external support and, thus, do not contact the insulation 120 lining the side walls 110 of the tank's enclosing structure.

FIGS. 2A, 2B, and 2C provide three schematic views of a single composite tank apparatus embodiment 200 for fluid containment as practiced according to the present disclosure. In embodiment 200, the composite tank is comprised at its core of three integrated metallic cells.

FIG. 2A illustrates schematically a top-side schematic plan view of a three-cell composite tank apparatus for fluid containment featuring all the same elements as FIG. 1A with the notable exception that the three-cell composite tank has in this embodiment only one accessway fitting 150 with fluid conduit and manway access penetrations. Accessway fitting 150, in this embodiment, is installed on the top cap 140 of the central cell of the three cells illustrated schematically in FIG. 2A.

FIG. 2B is a schematic midway cross-sectional view of the three-cell composite tank of embodiment 200 clearly illustrating key aspects and advantages of the composite tanks detailed in this disclosure. In embodiment 200, interiors of all three cells of the composite tank are in direct fluid communication by the provision of matching through-wall holes (called "lightening holes") in adjacent flat wall panel portions with the perimeters of the matched through-wall holes sealed together to structurally resist relative movement and prevent leakage of fluid from containment by, in this embodiment, continuous weldments joining the adjacent steel plates. In embodiment 200, the edge of a large lightening hole in the center of each of the adjacent, flush-contacting flat wall panel portions of the cells is stiffened by a flat-bar stiffener 201 that is welded in position along the entire perimeter of the lightening hole. Smaller through-wall holes 210 above and below the large lightening hole allow for fluid conduits to be run horizontally through the walls of adjacent cells.

In FIG. 2B, risers 310 and manifold 181 providing flow pathways connecting the interior spaces within tops 140 of the composite tank's three cells, while a second set of risers 310 and manifold 186 providing flow pathways from near the bottoms 160 of these cells, enabling simultaneous fluid injection to and extraction from the cells. A third riser 410 from manifold 186 to and through the accessway fitting 150 fabricated onto the top cap 140 of the central cell allows fluid to be injected at or withdrawn from the bottoms of the cells in the composite tank. Similarly, a fourth riser 430 from manifold 181 to and through the accessway fitting 150 allows fluid to enter or exit from upper portions of the integrated cellular array. A port may be opened in riser pipe 430 at or near the point where it exits through accessway fitting 150 to allow fluid to be injected to or purged from the high point in that fitting. Therefore, a separate riser conduit 310, as shown descending from the uppermost points in the two adjacent cells, is not required. It is worth noting that pressure balancing across the cells of this composite tank apparatus embodiment 200 is much less of a concern than for composite tanks designed according to U.S. Pat. No. 9,033,178 B2 because the interior spaces within all cells are in full direct fluid communication due to the through-wall openings in the adjacent flat wall panel portions. The horizontal conduits of manifolds 181 and 186 pass directly between cell through paired through-wall holes 210 in the adjacent flat wall portions. These holes may be just large enough to match the exterior of the conduits or they may be much larger such that the conduits are not supported directly by the cell wall material or weldment where it is penetrating through the walls. If the conduits are intended to fit the through-wall holes tightly, the surrounding material of the cell walls should be seal-welded to the exterior of the conduits. Whether the through-wall holes are a tight fit or oversized, perimeters of these holes must, in this embodiment, be sealed together in a way that ensures structural integrity and fluid tightness to prevent leakage from the composite tank.

FIG. 2C schematically illustrates a cross-sectional elevation view illustrating the placement of three through-wall holes in a flat wall panel portion of one of the three cells comprising the fluid containment core of composite tanks detailed in this disclosure. The large lightening hole in the center of the adjacent, flush-contacting flat wall panel portion is ringed by a flat bar stiffener 201 which can be included in the design of the cells and tank to ensure stability during handling and structural integrity during operation. Two smaller holes 210 have no ring stiffening but have continuous weldments around their perimeters to seal the adjacent flat plates to each other to ensure structural integrity and fluid tightness to prevent leakage from the composite tank. These smaller holes 210 are placed to allow the passage of fluid conduits for upper fluid conducting manifold 181 and lower fluid conducting manifold 186, but those manifolds are not shown in this figure for clarity. Of course, if large lightening holes are suitably placed, the horizontal conduits of manifolds 181 and 186 can be designed to run through those openings between adjacent cells. The manifold conduits running horizontally throughout the cellular array can be supported at the periphery of the lightening holes as needed to ensure stability of the fluid transfer system during operation. In general, there is no requirement that the conduits be welded to the skins of the cells where they pass through the adjacent flat wall panels. It is possible to use clamps instead of weldments at points where support is required.

Figure 3A:
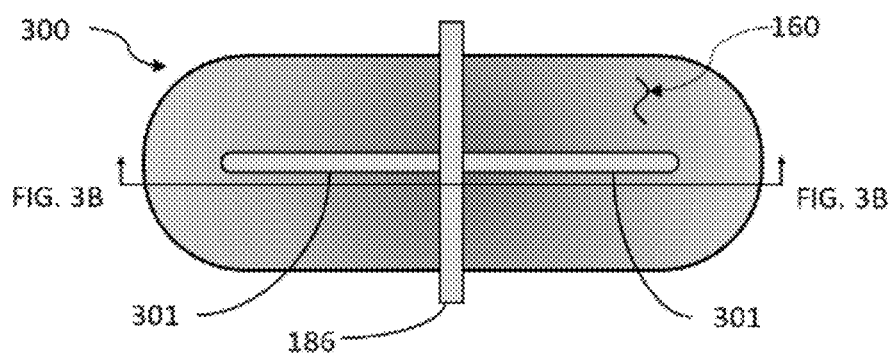
FIGS. 3A and 3B are schematic plan and cross-sectional views, respectively, illustrating one embodiment of a method for branching out the manifold arrangement to effectively drain outer portions of wide cells.
Figure 3B:
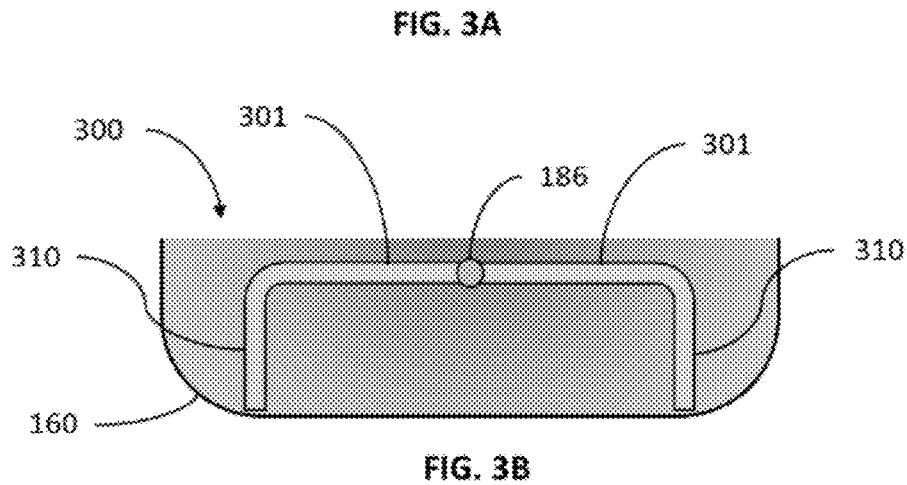

FIGS. 3A and 3B schematically illustrate two views of a lower portion of a single cell in a multi-cell composite tank apparatus embodiment 300 for fluid containment as practiced according to the present disclosure illustrating the concept for a branched manifold piping arrangement.

FIG. 3A provides a schematic plan view looking down on the bottom portion 300 of a single cell in the composite tank of this disclosure illustrating a branched manifold arrangement with branches 301 on both sides of the central conduit of manifold 186 to allow filling to or drainage from both sides of a wide storage cell. While in FIG. 3B, riser pipes 310 are schematically shown to extend from both branches 301 downward to near the bottom of the bottom cap 160.

While the lower manifold 186 and branches as schematically illustrated in FIGS. 2B, 3A, and 3B would likely be intended for injecting and withdrawing ("draining") liquids, an inverted arrangement in the upper portion of the cells (as illustrated schematically in FIG. 2B) would likely be intended for injecting and withdrawing lighter, gaseous fluids to and from at or near the tops of the cells in the composite tank.

Figure 4:
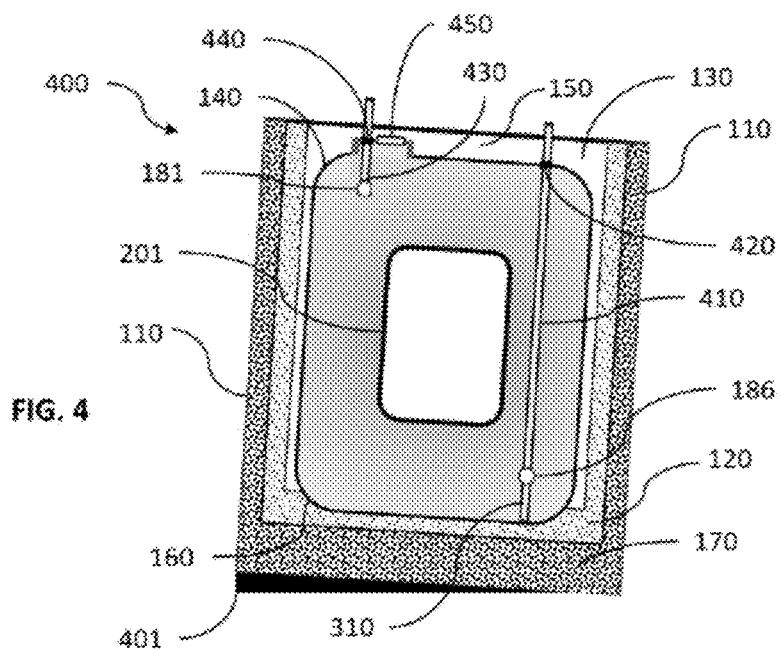
FIG. 4 is a schematic side elevation view, with parts broken away, illustrating how a bias can be permanently or temporarily imposed on the orientation of composite tanks of this disclosure to establish distinct high and low points in wide cells of such composite tanks to effectively drain the cells.

FIG. 4 illustrates schematically a cross-sectional elevation view within a two-sided cell that is part of an array of at least two cells comprising another composite tank embodiment 400 in accordance with the present disclosure, schematically illustrating how a bias can be permanently or temporarily imposed on the orientation of the composite tank of embodiment 400 to establish distinct high and low points in wide cells of the integrated array. A foundation 401 can be constructed beneath a fixed composite storage tank to impose a permanent bias or a temporary bias can be imposed on a composite storage tank that is constructed according to the present disclosure within the hull of a ship or barge by ballasting the vessel to impose a slight heel. If a similar temporary heel is desired in a composite tank's cellular array that is an ISO container or part of a trucking trailer or railcar, the unit can be positioned on a slanted surface (e.g., a ramp) that imposes the desired orientation. The individual cells may also be manufactured with a slight transversely sloping bias in their bottoms so that a distinct low point exists when assembled into other composite tank embodiments that otherwise has an essentially vertical orientation (i.e., no globally induced heel or bias of the tank). The angle of heel or bias of the tank or transverse slope manufactured into the bottom of the tank need not be very large to establish a practical low point—typically, not more than a couple degrees, but practically not more than about 5 degrees.

A riser pipe 310 in FIG. 4 is illustrated to be attached to lower manifold 186 allowing injection to and drainage from a point at or near the induced low point of bottom cap 160 within the cell shown. A riser 410 from manifold 186 to and through a fitting 420 fabricated into the top cap 140 of the cell illustrated in FIG. 4 allows fluid to enter or exit the integrated cellular array. Similarly, a riser 430 from manifold 181 to and through a fitting 440 fabricated into the top cap 140 of the cell illustrated in FIG. 4 allows fluid to enter or exit from upper portions of the integrated cellular array. A port may be opened in the riser pipe 430 at or near the fitting 440 to allow fluid to be injected to or purged from at or near the induced high point inside the cell illustrated in FIG. 4. Therefore, a separate riser conduit, such as illustrated in FIG. 2B as element 310, is not required or shown in FIG. 4. In certain embodiments, actively controlled valves (not illustrated) may be provided on the top of the risers 410 and 430, allowing isolation and control of flow for fluids intended to be stored within certain composite tank apparatus embodiments of this disclosure. As in FIGS. 1 and 2, the covering (e.g., roof) of the composite tank's enclosure is not being illustrated in FIG. 4. The valves are also not shown because practical operational considerations will typically place such common and necessary appurtenances conveniently outside of the enclosed containment space.

A manway access device 450 is shown as fabricated into the accessway fitting 150 fabricated onto the top cap 140 of the cell illustrated in FIG. 4.

Figure 5A:
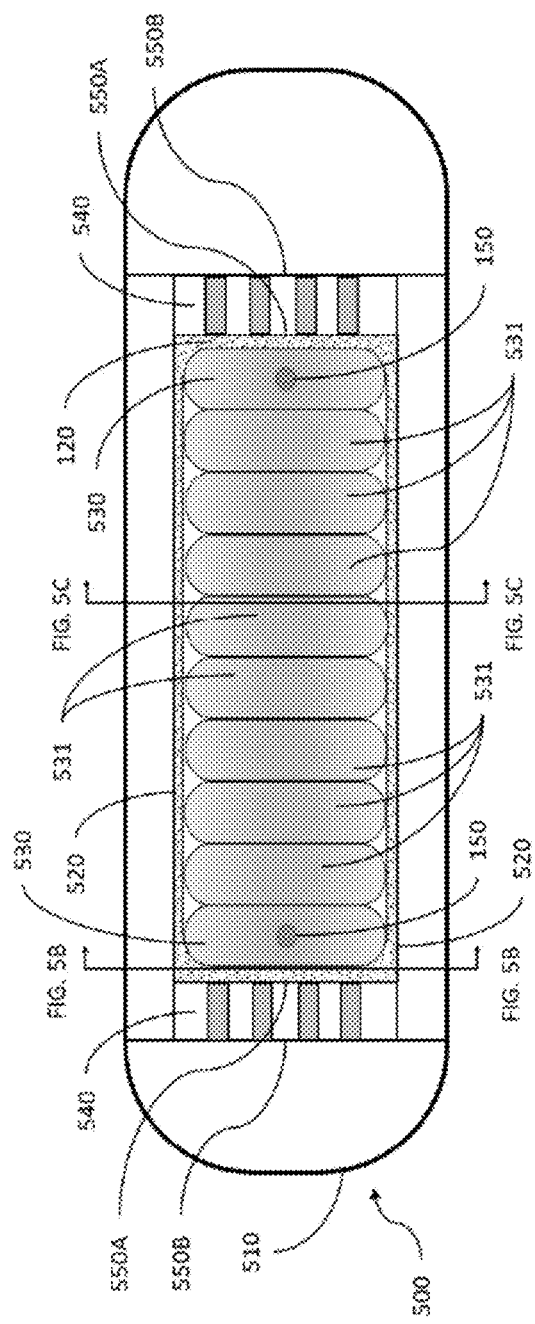
Figure 5B:
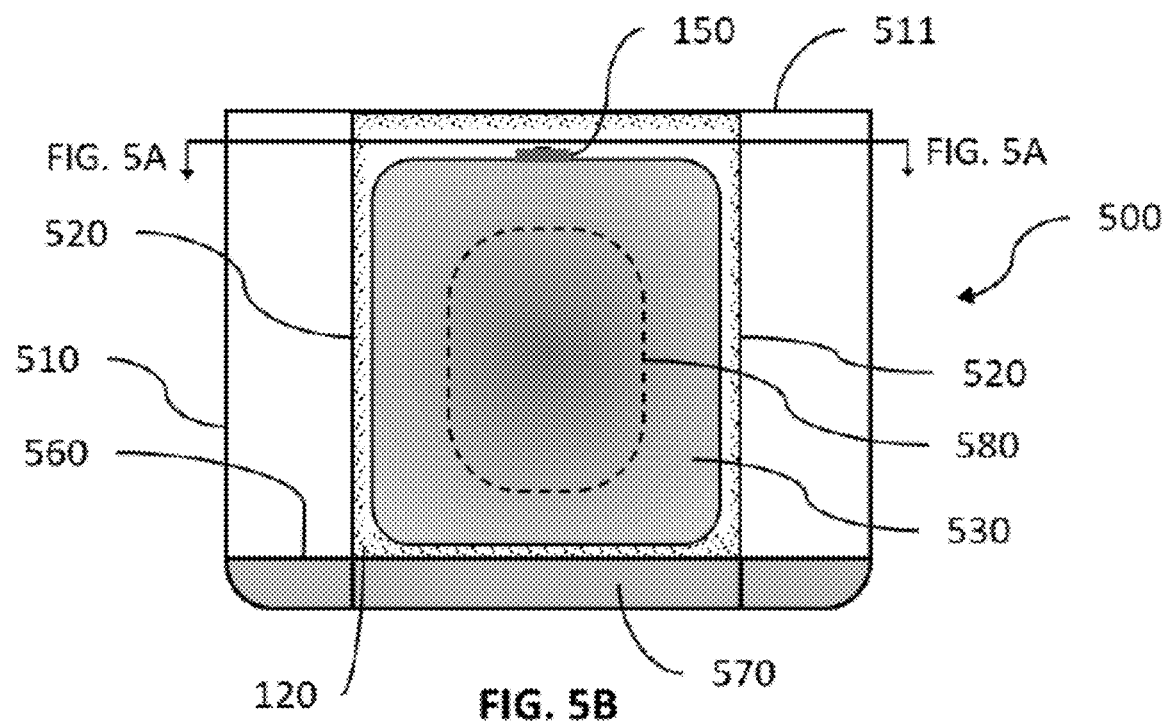
Figure 5C:
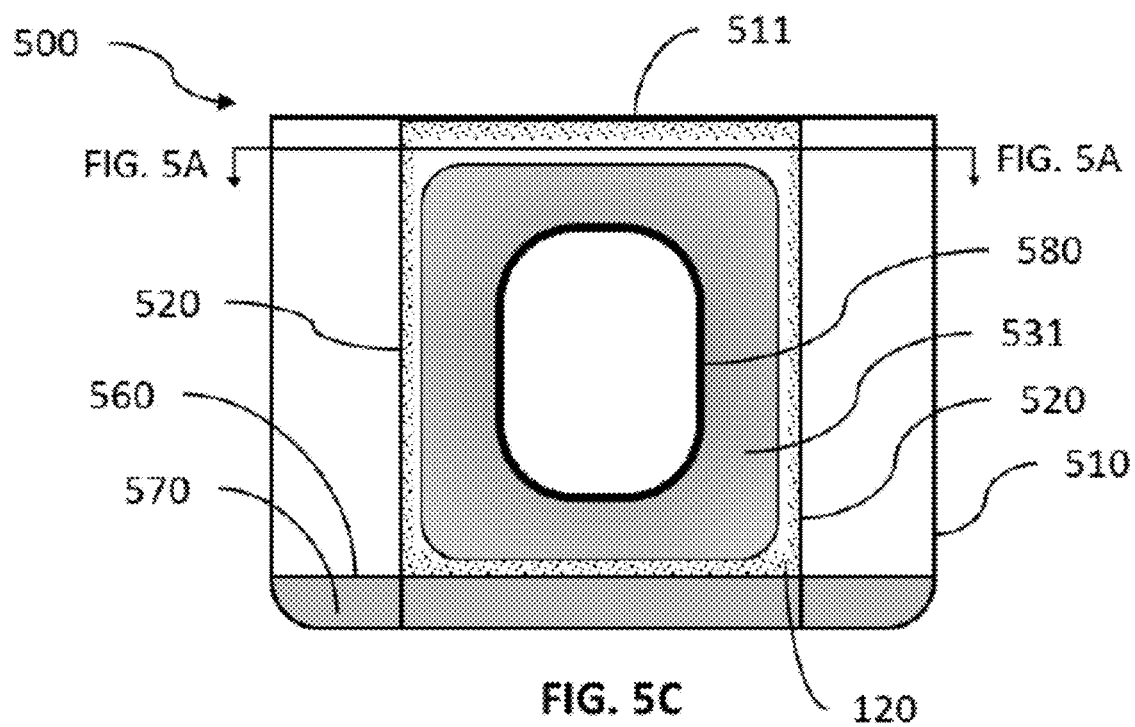

FIGS. 5A, 5B, and 5C schematically illustrate a multi-cell composite tank apparatus embodiment 500 (comprised of ten two-sided cells) with through-wall lightening holes provided in adjacent flat wall panel portions of the co-dependent cells confined within an insulated hold of a marine vessel (ship or barge) for storage or transport of fluid cargo according to one embodiment of the present disclosure. While the FIGS. 5A-5C depict a composite tank comprised of ten two-sided flask cells, there is theoretically no limit to the number of cells that may be lined up in this straight-line array. For clarity and ease of presentation, none of the internal fluid conduits (piping manifolds and risers) are depicted in FIGS. 5A, 5B, and 5C. For the same reasons, none of the conventional stiffening of hull structures is depicted in FIGS. 5A, 5B, and 5C.

FIG. 5A is a schematic plan view across the tops of a ten-cell composite tank apparatus embodiment 500 within the insulated hold of a marine vessel. The perimeter of the vessel's cargo hold is defined by the longitudinal bulkheads 520 and the transverse bulkheads 550A. The interior of the hold is lined with insulation 120 that can be designed and installed as a liner that protects the metal typically used in construction of a marine vessel's hull from temperatures associated with a cryogenic cargo fluid. In this embodiment, we may assume that the shell 510, bulkheads (520, 550A, and 550B), and supporting stiffening structures are made of mild or low alloy steel. The heavily stiffened regions 540 at both ends of the cargo hold are designed to effectively support the end bulkheads 550A for carrying the pressure being transmitted through the insulation 120 from the cells 530 at the ends of the array of two-sided cells. The reinforcing end structures 540 pick up the pressure-induced loading coming from the storage cells 530 for transfer primarily by shear into the longitudinal structure of the hull. Conventional longitudinal hull strength analysis must account for the additional stresses imposed by any pressure-induced loading on the cargo hold end bulkheads 550A.

In embodiment 500, eight two-sided cells 531 are linearly aligned to provide a continuous storage volume between the fore and aft ends of the end cells 530. The flat sides of all of the cells are in flush contact with their neighbors. The flat sides of the cells in contact with an adjacent cell include through-wall holes that provide fluid (and pressure) continuity throughout all cells of the composite tank. Straight-line arrangement of the cells can ensure that no unintended pressure forces are imposed on the longitudinal bulkheads 520. A relatively large space can be left open between the insulation lining the longitudinal bulkheads 520 and the curved edges of the cells. Common marine practice stipulates that a minimum of 40 cm clearance must be provided if human inspection of the space is required. If there is no contact between the cells and the insulation lining the longitudinal bulkheads 520, then conventional stiffening practice can be applied for design of those bulkheads.

Each of the end cells 530 in embodiment 500 feature an accessway fitting 150 with fluid conduit and manway access penetrations. Since the lightening holes and internal piping links the interior all of the cells in composite tank apparatus embodiment 500 are in direct fluid communication, it is possible to have only one such fitting 150 servicing the entire tank in embodiment 500.

FIG. 5B is a schematic side elevation view showing an exterior flat side of a two-sided flask cell 530 at either end of the array of ten two-sided cells comprising the composite tank within the insulated hold of a marine vessel in embodiment 500. A dashed line indicates a stiffener ring 580 lining a single large centrally placed lightening hole in the flat wall panel portion of the opposing side. The cell 530, featuring an accessway fitting 150 with fluid conduit and manway access penetrations, is situated within the insulated hold of a marine vessel 500 with its boundaries defined On this view) by the longitudinal bulkheads 520, the main deck 511, and the inner bottom 560. The interior of the hold is lined with insulation 120 which does not contact the edge of cell 530 but is thick enough and has a shaped recess to support its semi-circular bottom. The longitudinal bulkheads 520 are well spaced from the shell of the hull 510 to create wide wing spaces to protect the cargo space from damage in the event of a side impact on the hull. If the wing space is at least 20% of the beam of the vessel, then most codes assume that the cargo hold will not be penetrated in a side impact.

The inner bottom 560 is supported by a transverse bulkhead 570 in embodiment 500, as illustrated schematically in FIG. 5B. Conventional stiffening and deep frames will typically be configured to support the inner bottom 560 between transverse bulkheads like the one 570 illustrated in this view.

FIG. 5C is a schematic cross-sectional elevation view of a two-sided flask cell 531 within the insulated hold of a marine vessel in embodiment 500 illustrating a large centrally placed lightening hole in the flat wall panel portion that is stabilized with a flat-bar stiffener 580. The cell 531 is situated within the insulated hold of the marine vessel in embodiment 500 with its boundaries defined (in this view) by the longitudinal bulkheads 520, the main deck 511, and the inner bottom 560. The interior of the hold is lined with insulation 120 which does not contact the edge of cell 531 but is thick enough and has a shaped recess to support its semi-circular bottom. The longitudinal bulkheads 520 are well spaced from the shell of the hull 510 to create wide wing spaces to protect the cargo space from damage in the event of a side impact on the hull.

The inner bottom 560 is supported by a transverse bulkhead 570 in embodiment 500, as illustrated schematically in FIG. 5C. Conventional stiffening and deep frames will typically be configured to support the inner bottom 560 between transverse bulkheads like the one 570 illustrated in this view.

Figure 6A:
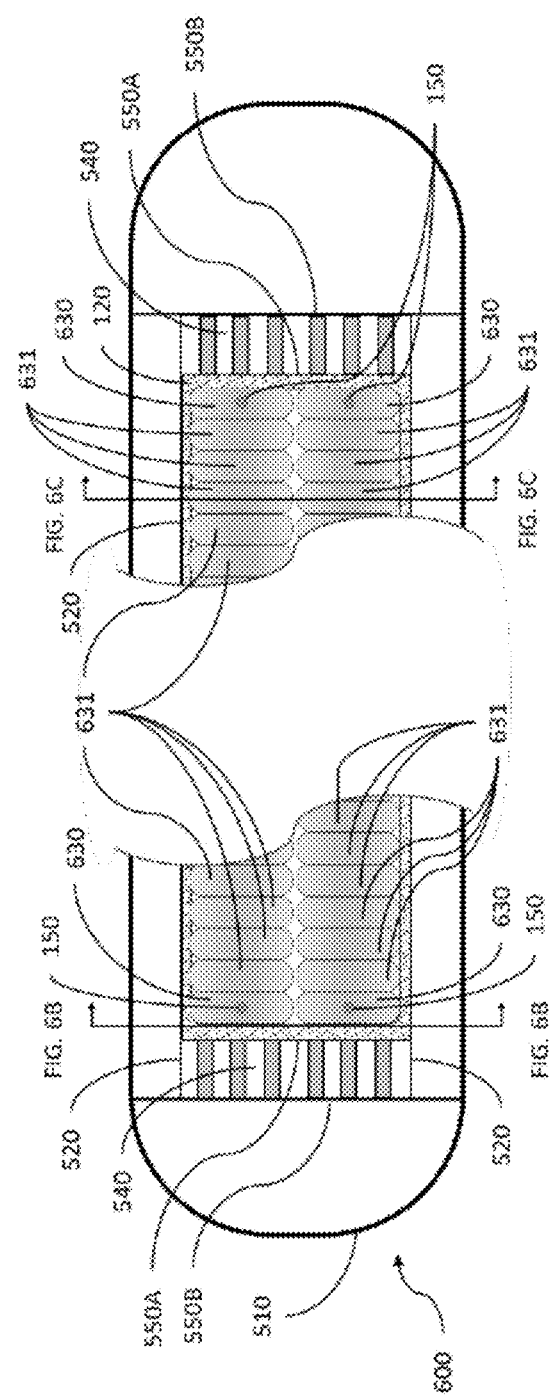
Figure 6B:
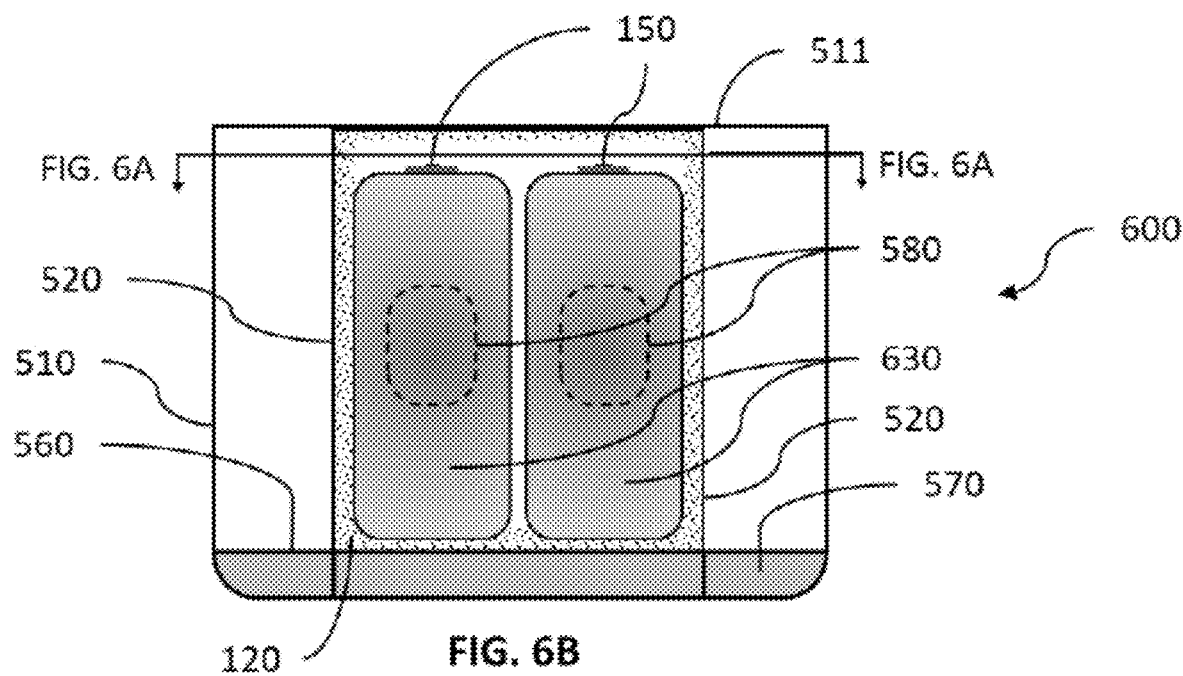
Figure 6C:
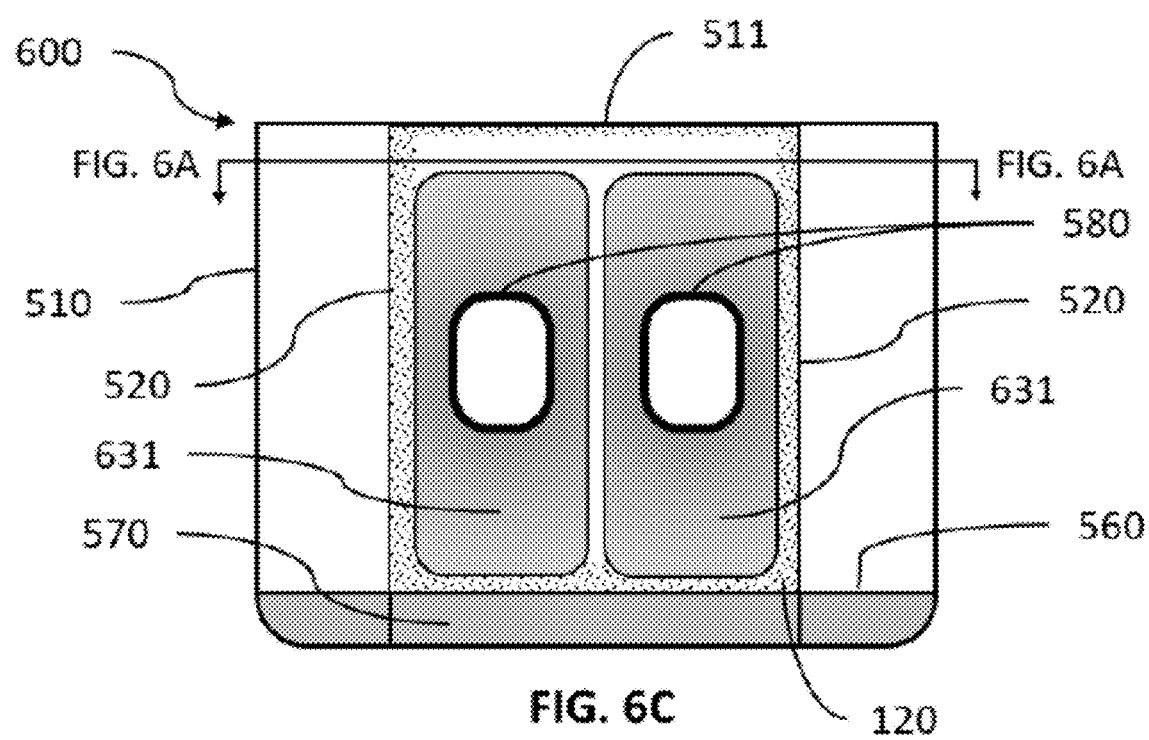

FIGS. 6A, 6B, and 6C schematically illustrate a two multi-cell composite tank apparatus embodiment 600 (comprised of an unspecified quantity of cells) with through-wall lightening holes provided in adjacent flat wall panel portions of the co-dependent cells confined within an insulated hold of a marine vessel (ship or barge) for storage or transport of fluid cargo according to one embodiment of the present disclosure. The two cellular arrays are arranged to run parallel to each other (side-by-side but not in contact with each other). For clarity and ease of presentation, none of the internal fluid conduits (piping manifolds and risers) are depicted in FIGS. 6A, 6B, and 6C. For the same reasons, none of the conventional stiffening of hull structures is depicted in FIGS. 6A, 6B, and 6C.

FIG. 6A is a schematic plan view across the tops of the two multi-cell composite tank apparatus of embodiment 600 within the insulated hold of a marine vessel. The perimeter of the vessel's cargo hold is defined by the longitudinal bulkheads 520 and the transverse bulkheads 550A and 550B. The interior of the hold is lined with insulation 120 that can be designed and installed as a liner that protects the metal typically used in construction of a marine vessel's hull from temperatures associated with a cryogenic cargo fluid. In this embodiment, we may assume that the shell 510, bulkheads (520, 550A, and 550B), and supporting stiffening structures are made of mild or low alloy steel. The heavily stiffened regions 540 at both ends of the cargo hold are designed to effectively support the end bulkheads 550A and 550B for carrying the pressure being transmitted through the insulation 120 from the cells 630 at the ends of each of the linear arrays of two-sided cells. The reinforcing end structures 540 pick up the pressure-induced loading coming from the storage cells 630 for transfer primarily by shear into the longitudinal structure of the hull. Conventional hull strength analysis must account for the additional stresses imposed by any pressure-induced loading on the cargo hold end bulkheads 550A and 550B.

An unspecified quantity of two-sided cells 631 are linearly aligned in embodiment 600 to provide a continuous storage volume between the fore and aft ends of the end cells 630 of each of the composite tanks in the hold. The flat sides of all of the cells are in flush contact with their neighbors in their specific linear array. The flat sides of the cells in contact with an adjacent cell include through-wall holes that provide fluid (and pressure) continuity throughout all cells of each composite tank. Straight-line, linear arrangement of the cells can ensure that no unintended pressure forces are imposed on the longitudinal bulkheads 520. A relatively large space can be left open between the two arrays and the insulation lining the longitudinal bulkheads 520 and the curved edges of the cells, if there is no contact between the cells and the insulation lining the longitudinal bulkheads 520, then conventional stiffening practice can be applied for design of those bulkheads.

In embodiment 600, each of the end cells 630 feature an accessway fitting 150 with fluid conduit and manway access penetrations.

FIG. 6B is a schematic side elevation view illustrating the exterior flat side of the two-sided flask cells 630 at either end of the two linear arrays of two-sided cells comprising the two composite tanks in embodiment 600 within the insulated hold of a marine vessel. Dashed lines indicate a stiffener ring 580 lining a single large centrally placed lightening hole in the flat wall panel portion of the opposing side of each of these cells 630. The cells 630, each featuring accessway fittings 150 with fluid conduit and manway access penetrations, are situated side-by-side within the insulated hold of a marine vessel 600 with its boundaries defined (in this view) by the longitudinal bulkheads 520, the main deck 511, and the inner bottom 560. The interior of the hold is lined with insulation 120 which does not contact the vertically-running radiused edges of the cells 630 but is thick enough and has shaped recesses to support their semi-circular bottoms. In this embodiment the longitudinal bulkheads 520 are well spaced from the shell of the hull 510 to create wide wing spaces to protect the cargo space from damage in the event of a side impact on the hull.

In embodiment 600, the inner bottom 560 is supported by a transverse bulkhead 570 as illustrated in FIG. 6B. Conventional stiffening and deep frames will typically be configured to support the inner bottom 560 between transverse bulkheads like the one 570 illustrated in this view.

FIG. 6C is a schematic cross-sectional elevation view of two two-sided flask cells 631 situated side-by-side within the insulated hold of a marine vessel of embodiment 600 illustrating large centrally placed lightening holes in their flat wall panel portions that are stabilized with flat-bar stiffeners 580. In embodiment 600, the cells 631 are situated within the insulated hold of a marine vessel with its boundaries defined (in this view) by the longitudinal bulkheads 520, the main deck 511, and the inner bottom 560. The interior of the hold is lined with insulation 120 which does not contact the vertically-running radiused edges of cells 631 but is thick enough and has shaped recesses to support their semi-circular bottoms. In this embodiment, the longitudinal bulkheads 520 are well spaced from the shell of the hull 510 to create wide wing spaces to protect the cargo space from damage in the event of a side impact, on the hull.

The inner bottom 560 is supported by a transverse bulkhead 570 as illustrated in FIG. 6C. Conventional stiffening and deep frames will typically be configured to support the inner bottom 560 between transverse bulkheads like the one 570 illustrated in this view.

As used herein the phrases "sufficient rigidity in support of the outwardmost flat side panel portions" and "the at least two flat-sided co-dependent cells of the array are prevented from over-expanding and displacing" mean that the specified layer of insulation material between the flat side panel portions and, for example, a buttressed reinforced concrete end or side wall of a composite tank's structural enclosure are rigid enough to ensure that the panel portions cannot deflect outward more than a few wall thicknesses and in the extreme for cells with panels of very large dimensions, say 30 to 120 feet wide and 40 to 150 feet tall, as much as 25 wall thicknesses; however, practical applications of buttressed reinforced concrete enclosures (or reinforced ships' cargo hold bulkheads) lined with insulation capable of withstanding internal operating pressures targeted in the present disclosure, say high density balsa wood, maximum center span deflections will typically be limited to less than about 5 cell wall thicknesses in certain embodiments, and in certain extreme embodiments, less than about 10 cell wall thicknesses such that, when internal pressure is established within the array of at least two flat-sided co-dependent cells at a targeted level for operations or survival, the at least two flat-sided co-dependent cells of the array are prevented from expanding and displacing to a degree that would generate unacceptable stresses or collapse according to the relevant current ASME Boiler and Pressure Vessel code as demonstrated by the following example calculations for an ASME SVIII-Div2, Type 1 composite tank comprised of an array of at least two two-sided flask cells with the following design parameters:

Operating pressure, P=225 psig (~15 barg);

Skin Material—SA553 (9% Ni with a Tensile Strength of 100 ksi) which is allowed to carry maximum stress of about 41.7 ksi under operating conditions according to the ASME code set noted for this example (welding specifications should ensure that the weld material is over-matched to avoid having any welds be a weak point in the composite tank);

The number of two-sided cells in the array comprising the composite tank in this example is three (meaning that one cell is sandwiched between two end cells so that this composite tank comprises only two pairs of flush-contacting flat wall side panels);

Individual cells have the following key dimensions—height is 64 feet, width is 40 feet, and the radius of radiused sections connecting the flat panel portions of the two-sided cells is 7.38 feet;

The skin of all three cells is specified at 0.75 inch (i.e., the wall thickness, $T_s$=0.75 inch or about 19 mm; however, the wall thickness of the top and bottom end caps may be specified to be a few millimeters thicker to ease fabrication and handling with a tangent tapered transition edge to match or nearly match the skin/wall thickness of the midbody of the cells where the caps will be welded to the midbody;

The size of through-wall lightening holes that may be cut or fabricated in the flat wall panels to match the hole or holes in the adjacent flush-contacting flat wall panel of the adjacent cell (i.e., the amount of material that may be eliminated from each flat wall panel if no reinforcement is planned around or near the perimeter of the hole as replacement for any of the wall material eliminated) may be estimated for initial design purposes as follows, assuming for this exemplary embodiment just one centrally located oval through-wall lightening hole is provided in each of the two flat wall panel sides of the central cell (aligned with matching lightening holes in the adjacent flat wall panel sides) of this 3-cell composite tank and the rigidity of the enclosure end wall and insulating liner is adequate to limit deflection of the central part of the outwardmost flat side panel portions to less than 5 cell wall thicknesses (note—hydrostatic head is ignored for simplicity/clarity in these calculations);

the vertical extent of an oval hole cut through the wall, $H_{cut}$, should be limited so that the horizontal stress component in the cell's skin (due to internal pressure, P, acting horizontally on the internal surface of the radiused sections running vertically bottom to top along the outward edges of each cell) at a plane cutting vertically across the narrow dimension of the central cell and orthogonal to the cell's width at the middle of the centrally located oval through-wall hole, defined in Equation 1:

$$P*(2*R*(H-2*R)+pi*R^2)/(2T*((H-2*R)-H_{cut})+T*2*pi*R) \quad (1)$$

does not exceed about 95% of the allowable stress value noted above, or does not exceed about 99% of the allowable stress value noted above; and the horizontal extent of an oval hole cut through the wall, $W_{cut}$, is limited so that the vertical stress component (due to internal pressure, P, acting vertically upward on the internal surface of the top cap/head) at a plane cutting horizontally across the cell at the middle of the centrally located oval through-wall hole, defined by Equation 2:

$$(P*(2*R*(W-2*R)+pi*R^2)-(\text{cell's steel weight})/2)/(2T*((W-2*R)-W_{cut})+T*2*pi*R)) \quad (2)$$

does not exceed about 95% of the allowable stress value noted above, or does not exceed about 99% of the allowable stress value noted above, so that the tri-axial stress state accounting for the orthogonal stress due to the moderate internal operating pressure acting directly on the flat wall panels and the bending induced stress across the thin (0.75 inch) wall that is limited by the rigidity of the supporting insulating liner and structural enclosure are accommodated by keeping a slight margin between these calculated stress components and the allowable stress value noted above such that the vertical extent of the centrally placed oval through-wall lightening hole would be limited to about 28.4 feet (~44% of H) and the horizontal extent of the hole would limited to about 15.9 feet (~40% of W) (detailed finite element analysis of the composite tank structure will be required to confirm that stress distributions throughout all system elements do not exceed the ASME code allowances in final design and, if cyclical pressure loading is anticipated, then fatigue life calculations must be performed accounting for the welding and inspection details specified for each composite tank's service and manufacturing process.

It should be understood that embodiments 200, 300, 400, 500, and 600 are only exemplary of many possible tank apparatus and methods. Suitable arrays of cells may have any longitudinal shape (straight, L-shaped, arcuate, for example S-shaped), and may have one or more parallel and/or series arranged regions. Ship holds may have any lateral (cross-sectional) shape, such as rectangular, oval, round, V-shaped, U-shaped, and the like. The cross-sectional shape may be the same or different along the length of a ship or other transport mechanism.

The flow rates of the fluids entering and exiting the tank apparatus or individual cells thereof will depend on many factors, including the dimensions of conduits, pressure of the fluids and cells, size of the tank apparatus and cells, the presence of flow control devices (such as orifices, control valves, in-line mixers, and the like), temperature of the fluids, viscosity of the fluids, and like parameters, but in general the flow rate of fluids into tank apparatus may range from about 5 gpm to about 5000 gpm (from about 1.136 cbm/hr. to about 1,136 cbm/hr.), or from about 20 gpm to about 500 gpm (or from about 4.544 cbm/hr. to about 113.6 cbm/hr.), or from about 50 gpm to about 300 gpm (from about 11.36 cbm/hr. to about 68.16 cbm/hr.).

Certain embodiments may comprise a process control scheme for the flow of fluids into and out of the tank apparatus. For example, a master process controller may be configured to provide any number of control logics, including feedback control, feed-forward control, cascade control, and the like. The disclosure is not limited to a single master process controller, as any combination of controllers could be used.

In certain embodiments, tank apparatus may be cooled or heated by a heat transfer fluid selected from the group consisting of gaseous, liquid, or combinations of gaseous and liquid compositions that functions or is capable of being modified to function as a heat transfer fluid. Gaseous heat transfer fluids may be selected from air, including ambient air and treated air (for air treated to remove moisture), inert inorganic gases, such as nitrogen, argon, and helium, inert organic gases such as fluoro-, chloro- and chlorofluorocarbons, including perfluorinated versions, such as tetrafluoromethane, and hexafluoroethane, and tetrafluoroethylene, and the like, and mixtures of inert gases with small portions of non-inert gases, such as hydrogen. Heat transfer liquids may be selected from inert liquids which may be organic, inorganic, or some combination thereof, for example, salt solutions, glycol solutions, oils and the like. Other possible heat transfer fluids include steam, carbon dioxide, or mixtures thereof with nitrogen. Heat transfer fluids may be compositions comprising both gas and liquid phases, such as the higher chlorofluorocarbons.

Although only a few exemplary embodiments of this disclosure have been described in detail above, those skilled in the art will readily appreciate that many modifications are possible in the exemplary embodiments without materially departing from the novel apparatus and processes described and claimed herein. Accordingly, all such modifications are intended to be included within the scope of this disclosure as defined in the following claims. In the claims, no clauses are intended to be in the means-plus-function format allowed by 35 U.S.C. § 112(f) unless "means for" is explicitly recited together with an associated function. "Means for" clauses are intended to cover the structures described herein as performing the recited function and not only structural equivalents, but also equivalent structures.

What is claimed is:

1. A composite tank apparatus for fluid containment at pressures at or near ambient to moderate pressures comprising:
   a) an array of at least two flat-sided co-dependent cells with relatively thin skin cell walls made of metallic or non-metallic materials, each of the at least two flat-sided co-dependent cells having at least two flat wall panel portions connected by radiused sections arranged such that all of the flat wall panel portions of the at least two flat-sided co-dependent cells are either in flush contact with flat wall panel portions of adjacent ones of the at least two flat-sided co-dependent cell or in flush contact with flat supporting panels of an enclosing structure (or thermal insulating material lining interior flat surfaces of the enclosing structure) enclosing the array of at least two flat-sided co-dependent cells, each of the at least two flat-sided co-dependent cells having a top and a bottom cap connected respectively to top and bottom ends of the at least two flat wall panel portions comprising flat walls joined by the radiused sections;
   b) the at least two flat-sided co-dependent cells sealed with each other around a perimeter of at least one matching pair of lightening through-wall holes provided in the flush-contacting flat wall panel portions of the adjacent ones of the at least two flat-sided co-dependent cells in the composite tank, the perimeter of all the pairs of lightening through-wall holes sufficiently sealed to structurally resist relative movement and prevent leakage of fluid from containment;

c) the enclosing structure having an interior surface and an exterior surface, the enclosing structure configured to provide environmental isolation with sufficient structural strength and with sufficient rigidity to support exterior flat side panel portions of the at least two flat-sided co-dependent cells at exterior portions of the array of at least two flat-sided co-dependent cells such that, when internal pressure is established within the array of at least two flat-sided co-dependent cells at a targeted level for operations or survival, the at least two flat-sided co-dependent cells of the array are prevented from over-expanding and displacing; and d) optionally, one or more layers of thermally insulating material lining the interior surface or the exterior surface of the enclosing structure.

2. The composite tank apparatus of claim 1 wherein the cell walls are selected from steel alloys or aluminum alloys, the cell walls having thickness ranging from typically much less than about 25.4 mm to about 76.2 mm.

3. The composite tank apparatus of claim 1 wherein the cell walls are selected from fiber-impregnated artificial rubber sheet, fiber-resin matrix, or ferro-cement materials.

4. The composite tank apparatus of claim 1 wherein the perimeter of all the pairs of lightening through-holes are sealed by a continuous weldment joining the adjacent pairs of the flush-contacting flat wall panel portions.

5. The composite tank apparatus of claim 1 wherein the at least two flat-sided co-dependent cells of the array are configured to be prevented from expanding and displacing beyond limits that would induce horizontal and vertical stresses exceeding about 95% of allowable horizontal and vertical stress values under operating pressure.

6. The composite tank apparatus of claim 1 wherein the at least two flat-sided co-dependent cells of the array are configured to be prevented from expanding and displacing beyond limits that would induce horizontal and vertical stresses exceeding about 99% of allowable horizontal and vertical stress values under operating pressure.

7. The composite tank apparatus of claim 1 configured for storage of fluids that must be contained at temperatures at least 10° C. different from normal ambient conditions.

8. The composite tank apparatus of claim 1 configured to receive and store fluid at temperatures below about minus 40° C., the enclosing structure comprised of non-cryogenic (mild or low alloy) steel, and one or more layers of thermally insulating material sufficient to establish a barrier to protect the steel from risk of brittle failure.

9. The composite tank apparatus of claim 1 comprising one or more fluid accessways, openings, or conduits for injection and withdrawal of fluids.

10. The composite tank apparatus of claim 9 wherein the fluid accessways comprise one or more conduits that penetrate into the top or bottom caps of one or more of the at least two flat-sided co-dependent cells comprising the composite tank apparatus to join with conduits that run horizontally within co-dependent cells and through adjacent interior walls of the array of the at least two flat-sided co-dependent cells allowing simultaneous injection and ejection of fluids.

11. The composite tank apparatus of claim 1 comprising one or more top-mounted accessway fittings to allow humans or non-human devices to gain access to interiors of all of the at least two flat-sided co-dependent cells for their inspection, monitoring, and/or repair.

12. The composite tank apparatus of claim 1 comprising one or more top cap-mounted accessway fittings comprising pressure-competent fluid conduits through the top cap of one or more of the at least two flat-sided co-dependent cells for the purpose of injecting fluids into or withdrawing fluids from the composite tank apparatus.

13. The composite tank apparatus of claim 1 comprising one or more bottom cap-mounted accessway fittings comprising pressure-competent fluid conduits through the bottom cap of one or more of the at least two flat-sided co-dependent cells for the purpose of injecting fluids into or withdrawing fluids from the composite tank apparatus.

14. The composite tank apparatus of claim 1 comprising at least one internally interconnecting manifold extending into all of the at least two flat-sided co-dependent cells of the composite tank apparatus through the lightening through-wall holes across adjacent walls of the co-dependent cells comprising the composite tank apparatus.

15. A method of making a substantially metallic composite tank system:

a) providing a plurality of thin metallic flat wall panel portions, a plurality of metallic radiused sections, and a plurality of metallic top and bottom caps to produce at least two flat-sided co-dependent cells with relatively thin skins;

b) optionally providing one or more accessways where and as needed in the plurality of thin metallic flat wall panel portions;

c) optionally providing one or more penetrations where and as needed in the plurality of metallic top and bottom caps;

d) fastening the flat panel portions to tangent edges of the plurality of radiused sections to form a plurality of cell bodies, and fastening the plurality of metallic top and bottom caps (with their tangent edges) to the plurality of cell bodies to form the at least two flat-sided co-dependent cells with relatively thin skins;

e) arranging the at least two flat-sided co-dependent cells with relatively thin skins such that all of the flat wall panel portions of the at least two flat-sided co-dependent cells are either in flush contact with each other or in flush contact with flat supporting panels of an enclosing structure (or thermal insulating material lining an interior of the enclosing structure) to form an enclosed array of at least two flat-sided co-dependent cells;

f) sealing the at least two flat-sided co-dependent cells with each other around a perimeter of at least one matching pair of lightening through-wall holes provided in adjacent pairs of the flush-contacting flat wall panel portions of the at least two flat-sided co-dependent cells in the composite tank, the perimeter of all the matching pairs of lightening through-wall holes sufficiently sealed to structurally resist relative movement and prevent leakage of fluid from containment; and g) the enclosing structure having an interior surface and an exterior surface, the enclosing structure and cover configured to provide environmental isolation with sufficient structural strength and with sufficient rigidity to support exterior flat side panel portions of the at least two flat-sided co-dependent cells at exterior portions of the array of at least two flat-sided co-dependent cells such that, when internal pressure is established within the array of at least two flat-sided co-dependent cells at a targeted level for operations or survival, the at least two flat-sided co-dependent cells of the array are prevented from expanding and displacing to such a degree that the resulting stresses exceed relevant pressure vessel code allowables or structural instability occurs.

16. A method of flowing a fluid into and extracting a same or different fluid from tops and bottoms of an array of at least two flat-sided cells of a composite tank apparatus for fluid containment, the composite tank apparatus having through-wall lightening holes in adjacent flat wall panel portions of all adjacent cells of the array of at least two flat-sided cells, the cells each having a top cap and a bottom cap, the method comprising:
 (a) providing upper and lower horizontal fluid conducting manifolds that extend internally through the through lightening holes in adjacent flat wall panel portions of all adjacent cells of the array of at least two flat-sided cells comprising the composite tank apparatus;
 (b) providing a first plurality of risers fluidly connected to and running from the upper horizontal fluid conducting manifold to near a top of each cell's top cap in the array of cells comprising the tank apparatus providing a flow path from the top of each cell into the upper horizontal fluid conducting manifold;
 (c) providing a second plurality of risers fluidly connected to and running from the lower horizontal fluid conducting manifold to near a bottom of each cell's bottom cap in the array of cells comprising the composite tank apparatus providing a flow path from the bottom of each cell into the lower horizontal fluid conducting manifold;
 (d) providing at least one third riser fluidly connected to and running from the upper horizontal fluid conducting manifold to and through an accessway fitting on the top cap or bottom cap of at least one of the cells in the array of cells comprising the composite tank apparatus;
 (e) providing at least one fourth riser fluidly connected to and running from the lower horizontal fluid conducting manifold to and through an accessway fitting on the top cap or bottom cap of at least one of the cells in the array of cells comprising the composite tank apparatus; and
 (f) flowing a low density fluid of a first specified pressure and a first temperature into or out of an upper part of the composite tank apparatus of the first aspect through the at least one third riser of while flowing a higher density fluid of the same or different chemical composition and of a second specified pressure and a second temperature simultaneously into or out of the bottom of the cells in the array of cells comprising the composite tank apparatus of the first aspect through the at least one fourth riser in a manner that allows a targeted pressure and temperature regime to be maintained within the composite tank apparatus.

17. The composite tank apparatus of claim 1 wherein the composite tank apparatus is constructed as a part of a facility selected from:
 a) a storage facility fixed permanently or temporarily in place on land,
 b) a transportable ISO container;
 c) a trailer for over-road transport;
 d) a rail cargo car or rail fuel tender for rail transport;
 e) a cargo or fuel containment within or on a barge or ship.

18. The method of claim 16 wherein the composite tank apparatus is used to store fluids selected from LNG, NGL, $NH_3$, $CO_2$, and $H_2$ as a dense gas, a liquid, or captured in a slurry of molecules (e.g., magnesium hydride suspended in mineral oil, such as the material known under the trade designation Hydrilyte™).

19. The method of claim 16 wherein the composite tank apparatus is used to transport fluids selected from LNG, NGL, $NH_3$, $CO_2$, and $H_2$ as a dense gas, a liquid, or captured in a shirr of molecules (e.g., magnesium hydride suspended in mineral oil as Hydrilyte™.

20. The method of claim 15 comprising structurally combining all cells in the cellular array to establish a primary containment of the composite tank apparatus, wherein matching through-wall holes are opened in adjacent, flush-contacting flat wall panel portions and their aligned perimeters are welded or clamped together in a way that structurally resists relative movement and prevents leakage of fluid from containment.

21. The method of claim 15 comprising fluidly linking all cells in an integrated cellular array comprising a primary containment of the composite tank apparatus to establish internal flow paths from within the bottom caps and top caps and through the flat wall panel portions of the cells of the composite tank apparatus with lower and upper manifolds connecting uptake riser and downcomer riser pipe sections from near the lowest internal point of each cell's bottom and the highest internal point of each cell's top wherein these lower and upper manifolds include riser elements that tightly penetrate the skin of at least one cell of the composite tank to enable the injection to and extraction from the composite tank's primary containment.

22. The method of claim 21 for fluidly linking all cells in the cellular array comprising the primary containment of the composite tank apparatus to establish internal flow paths from all portions of the composite tank apparatus wherein manifolded flow paths include branches reaching near enough to all lower and upper extremes of an internal volume of the primary containment to effectively fill and drain the primary containment of fluids.

23. The method of claim 21 for fluidly linking all cells in the cellular array comprising the primary containment of the composite tank apparatus to establish internal flow paths from all portions of the composite tank apparatus wherein the composite tank apparatus' orientation is biased with a transverse inclination such that the bottom caps of all its cells each have a definitive low point at or near the intake of a riser attached to a lower piping manifold or one of its branches to effectively fill and drain the tank of liquid or dense phase fluids and a definitive high point at or near the intake of a riser attached to an upper manifold or one of its branches to effectively fill and purge the tank of lighter dense phase or gaseous fluids.

* * * * *